United States Patent Office 3,247,053
Patented Apr. 19, 1966

3,247,053
INHIBITING THE GROWTH OF ALGAE IN WATER WITH N-(2-AMINOALKYL) ALKYLAMINE
Edward B. Hodge, Terre Haute, Ind., assignor to Commercial Solvents Corporation, a corporation of Maryland
No Drawing. Filed Mar. 2, 1964, Ser. No. 348,753
5 Claims. (Cl. 167—22)

The present invention relates to the treatment of industrial waters such as are used in swimming pools and circulated through heat exchangers, cooling ponds, towers and like apparatus, and more particularly to the treatment thereof with a compound or compounds capable of inhibiting the growth of algae and like organisms.

Industrial waters that have been passed through heat exchangers and like devices for absorbing the heats of chemical reactions, sensible heats, latent heats and the like, such as those occurring in the practice of distillation, cracking, fractionation, etc., are usually cooled and recycled for reuse. Cooling is most efficiently accomplished in the well known cooling tower wherein the water flows downwardly over a series of baffles and is subjected to contact with the atmosphere or in spray devices wherein the water is sprayed into the air and collected in a surrounding pond.

A material problem in the operation of such towers and other cooling devices is the growth of algae and similar organisms. Algae are very small and simple forms of plant life which usually combine in large masses, generally as stringy weed-like formations. Such formations attach themselves to any solid object with which the algae-containing water comes into contact. Other types of algae float and form the scum often seen on still water. Under favorable conditions of light and temperatures, algae develop a very disagreeable odor and unpleasant, fishy taste. The latter developments occur especially with the type of algae known as blue-green algae. Other organisms such as slime bacteria surround themselves with gelatinous secretion, actually forming slimy masses which are quite undesirable in cooling systems where, for example, they seriously interfere with the flow of water.

Such algae constitute a major problem in the handling of industrial waters in that they tend to coat any surface they contact and tend to block pipes and passages. The coating of such pipes is a most important disadvantage in association with refrigerating systems since the coating forms an insulation over the heat transfer surfaces and prevents maximum heat exchange.

Heretofore, several methods of removing the algae have been attempted, including mechanical cleaning and/or separation; however, mechanical cleaning is not always feasible because of the many small and relatively inaccessible pipes involved as in a heat exchanger and the necessity for shutting down the heating equipment for the process. Removal of the algae from water by mechanical separation, e.g., filtration, has also proved unsuccessful since the filters quickly become clogged, thus increasing filtration costs, and additionally, it is always necessary to aerate the water very thoroughly. Other proposals such as keeping light away from the water, maintaining high velocity turbulent flows, the periodic circulation of relatively hot water, and the use of electrical currents have also been generally unsuccessful. Chemical treatment as with copper salts, for instance, have been proposed but thus far have not been entirely satisfactory because of the corrosive effect of the chemicals on the metal apparatus, toxicity, and danger in handling. Like problems have been encountered in the treatment of swimming pool waters, etc.

It has now been surprisingly discovered that the growth or the development of algae in water systems, reservoirs and the like, can be inhibited by the presence of N-(2-aminoalkyl) higher alkylamines, the alkylamine radical of which contains from about 8 to 18, generally above 10, carbon atoms and the 2-aminoalkyl radical of which contains up to about 8 carbon atoms, e.g., N-(2-aminoisobutyl)dodecylamine. Where a heavy growth of algae has already developed, it can be inhibited by the addition of suitable amounts of these higher aliphatic, e.g., alkylamines. After a heavy growth has been inhibited, a much lower concentration can be used to prevent reinfestation, or to prevent infestation and growth of the undesired organisms in a newly installed system. The higher alkylamines of the present invention can also be used to prevent the formation of slime deposits by inhibiting slime bacteria.

The primary aliphatic e.g. alkyl, amines of the present invention may be represented by N-(2-aminoisbutyl) dodecylamine. These higher aliphatic amines are produced by hydrogenation of the reaction product of the primary amine, a nitroparaffin and formaldehyde. N-(2-aminoisobutyl) dodecylamine, for example, is produced by hydrogenation of the nitro substituted amine produced by the reaction of dodecylamine, 2-nitropropane and formaldehyde as illustrated by tehe following equation.

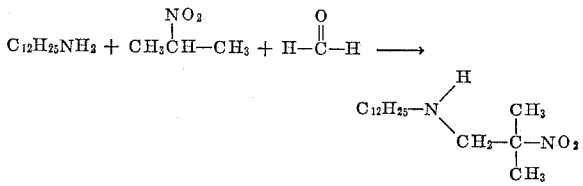

In general, higher primary aliphatic amines having a carbon chain length of about 8 to 18 carbon atoms may be used to produce the long chain diamines of the present invention. Such amines include, for example, octylamine, decylamine, undecylamine, dodecylamine, tetradecylamine, hexadecylamine and octadecylamine. The amines may be reacted separately in accordance with the above equation to produce the individual long chain diamines of the present invention or other types may be produced from straight chain aliphatic derivatives obtained from coconut oil, for example. These other types will be mixtures of long chain diamines with different hydrocarbon chain length. Derivatives of palm kernel oil, soybean oil, etc., may also be used.

Nitroparaffins which may be used include those not having the nitro group attached to a tertiary carbon atom, e.g., primary and secondary nitroparaffins, especially those nitroparaffins having up to about 8 preferably up to about 6 carbon atoms, such as nitromethane, nitroethane, 2-nitropropane, 2-nitrobutane, 1-nitropentane, and the like.

The alkylamine is incorporated in aqueous systems, according to the present invention, in algaestatic amounts and the amount used in a particular industrial water or coolant will depend upon a number of different factors such as the degree of contamination by the algae, the rate of circulation of the liquid, the character of the apparatus through which the liquid is circulated, the character of the liquid, the temperature extreme to which it is subjected, and the material from which the cooling pond walls may be formed. In the case of old liquids, a high initial charge followed by reduced charges at intervals may be desirable. With fresh liquid, the heavy initial charge may be omitted. For algae inhibition in general, concentrations of from about 1 to 10,000 p.p.m. can be satisfactorily used to inhibit the growth of algae. About 10 to 500 p.p.m. is a preferable concentration.

Since different species of algae may be encountered, some of which may be more affected by the different alkylamines than others, it may be desirable in some cases to charge the water with a mixture of alklamines in accordance with the character of the algae content. In all cases, it is desirable that the character and amount of the alkylamine be so selected that the corrosion of the associated apparatus is held to a minimum.

The following example serves to illustrate the present invention without, however, limiting the same.

*Example I*

N-(2-aminoisobutyl)dodecylamine was tested for its algaestatic activity. Primary algaestatic tests against *Chlorella pyrenoidosa* were made at concentrations of 10, 100 and 1000 p.p.m. in nine series and all showed inhibition of growth.

Secondary algaestatic tests were made with individual stock cultures. *Chlorella pyrenoidosa, Chlamydomonas reinhardti, Scenedesmus obliquus,* and *Oscillatoria tenuis.* N-(2-aminoisobutyl) dodecylamine was used at 1, 10 and 100 p.p.m. and growth was inhibited.

Studies with recirculating water systems indicated that this compound at 100 p.pm. was about 83% effective in the control of growth of algae, slime and other similar microorganisms.

*Example II*

N-(2-aminoisobutyl)decylamine in concentrations of about 100 p.p.m. is used to inhibit the growth of algae in industrial waters.

*Example III*

N-(2-aminoisobutyl)tetradecylamine in concentrations of about 100 p.p.m. is used to inhibit the growth of algae in industrial waters.

*Example IV*

N-(2-aminoisobutyl)octadecylamine in concentrations of about 100 p.p.m. is used to inhibit the growth of algae in industrial waters.

*Example V*

N-(2-aminopropyl)dodecylamine in concentrations of about 100 p.p.m. is used to inhibit the growth of algae in industrial waters.

*Example VI*

N-(2-amino-2-methylbutyl)dodecylamine in concentrations of about 100 p.p.m. is used to inhibit the growth of algae in industrial waters.

Obviously, many modifications and variations of the invention as above set forth may be made without departing from the scope of the invention.

What is claimed:

1. A process for inhibiting the growth of algae in water which comprises introducing into the water in contact therewith N-(2-aminoalkyl) alkylamine, the alkylamine radical of which contains from about 8 to 18 carbon atoms and the 2-aminoalkyl radical of which contains up to about 8 carbon atoms, in an amount effective to inhibit the growth of algae.

2. The process of claim 1 wherein said amine is introduced in a concentration of from about 1 p.p.m. to about 10,000 p.p.m.

3. A process according to claim 2 wherein said amount is about 10 to 1,000 p.p.m.

4. The process of claim 3 wherein the aliphatic amine is N-(2-aminoisobutyl)dodecylamine.

5. A process for destroying and inhibiting the growth of algae and slime in industrial water systems, which comprises incorporating in contact therewith N-(2-aminoalkyl) alkylamine, the alkylamine radical of which contains from about 8 to 18 carbon atoms and the 2-aminoalkyl radical of which contains up to about 8 carbon atoms in the water system in an amount effective to inhibit said growth in the water system.

References Cited by the Examiner

UNITED STATES PATENTS

| | | | |
|---|---|---|---|
| 2,393,293 | 1/1946 | Corley | 210—23 |
| 2,878,155 | 3/1959 | Cruicksnank | 167—22 |
| 3,125,486 | 3/1964 | Schmitz et al. | 167—22 |
| 3,140,976 | 7/1964 | Berenschot et al. | 167—22 |
| 3,142,615 | 7/1964 | Wehner | 167—22 |

LEWIS GOTTS, *Primary Examiner.*